May 2, 1961         G. GOERTZEL         2,982,473

REACTOR REACTIVITY METER

Filed April 10, 1956

INVENTOR
GERALD GOERTZEL
BY
ATTORNEYS

United States Patent Office 2,982,473
Patented May 2, 1961

2,982,473

REACTOR REACTIVITY METER

Gerald Goertzel, White Plains, N.Y., assignor to Nuclear Development Corporation of America, White Plains, N.Y., a corporation of New York Filed Apr. 10, 1956, Ser. No. 577,374

3 Claims. (Cl. 235—197)

This invention relates to instrumentation for monitoring the performance of a nuclear reactor and more particularly to a computing instrument for indicating the reactivity of a nuclear reactor.

The reactivity, $\rho$ (rho), of a nuclear reactor is defined as the ratio at any given time of the excess multiplication factor, $k_{\text{ex}}$, to the effective multiplication factor, $k_{\text{eff}}$. The effective multiplication factor is defined as the number of neutrons absorbed in the reactor plus the number of neutrons leaking out of the reactor, the sum denoted by $k$, all multiplied by the non-leakage probability, P, which is a characteristic of the particular reactor. The excess reactivity is further defined as the effective reactivity minus one. Thus, $$\rho = \frac{k_{\text{ex}}}{k_{\text{eff}}}$$

where $k_{\text{ex}}$ equals $k_{\text{eff}}-1$ and $k_{\text{eff}}$ equals $k\text{P}$. The notation $\delta k/k$ is sometimes used to denote this ratio.

It is known that the operational behavior of nuclear reactors is generally in accord with certain theoretical expressions and that, in particular, the change with time of the number of neutrons per unit volume at a given location in a nuclear reactor is given by the expression $$\frac{n}{l} \frac{\delta k}{k} = \dot{n} + \dot{c}_1 + \dot{c}_2 + \dot{c}_3 + \dot{c}_4 + \dot{c}_5 + \dot{c}_6$$

where $\dot{c}_i$ equals $$-\lambda_i c_i + \beta_i \frac{n}{l}$$

In these expressions:

$n$ is proportional to the number of neutrons in the reactor;

$l$ is the prompt neutron lifetime and is characteristic of the reactor and its nuclear materials;

$\delta k/k$ is the reactivity as previously defined;

$c_i$ is proportional to the number of delayed neutron emitters of type $i$ in the reactor;

$\lambda_i$ is the reciprocal mean life of the precursors of delayed neutron emitters of type $i$;

$\beta_i$ is the fraction of all fission neutrons which arise from delayed neutron emitters of type $i$;

$\dot{n}$ and $\dot{c}$ are the derivatives with respect to time of $n$ and $c$, respectively; and $\beta_i$ and $\lambda_i$ are characteristics of the fissionable material used in the reactor and the specific values for one or the other, or both, may be different for particular fissionable materials such as $Pu^{239}$ and $U^{235}$.

A property of the expression given above is that, if the characteristic values of $l$, $\beta_i$ and $\lambda_i$ are known for a particular reactor material and the total number of fission neutrons, $n$, in the reactor is given as a function of time, then the other variables, and in particular the reactivity, $\rho$ or $\delta k/k$, may be deduced. The solution of the equations set forth above is a tedious process if carried out manually and requires a high degree of mathematical skill. Moreover, such manual computation requires an impractical amount of time when it is desired to know the instantaneous reactive state of an operational reactor. A consequence of this is that starting up a reactor or changing its power level is very tedious, because each small change in condition of operation requires a new calculation so that the operator may know that the reactor is always within safe operating limits. In practice, the calculations are sometimes not performed and less reliable and complete information is made to suffice. A consequence of this is that in operating a reactor burdensome precautionary restrictions are imposed on the rate of increase of reactivity.

Techniques have been devised whereby the reactivity may be derived from a computation involving the reactor period under a particular reactive state. However, this method also requires a new computation for each step-by-step change of the reactive state of the reactor and is subject to the same general criticism as the method previously described.

I have invented reactivity computing apparatus which shows, continuously and in real time, on a directly read output indicator the reactivity of a nuclear reactor. This makes possible for the first time safe and uninterrupted change in the power level of a reactor and eliminates the previously required indirect manual computations to determine the reactive state at any given time. Moreover, because the real operating conditions of the reactor are promptly and accurately known, the operator is relieved from employing exaggerated precautionary restrictions on the permissible changes in reactivity.

This new computing apparatus comprises a novel and relatively simple combination of electronic apparatus utilizing, in part, individual items of equipment and instrumentation which are presently used in reactor installations. According to my invention, I utilize a source of voltage proportional to the total neutron flux of the reactor. Such a source may be an ionization chamber within the reactor core itself and a suitable amplifying means. An impedance network connected to the voltage source is utilized to establish the electrical analogs of certain functions related to the total neutron flux. This impedance network comprises a capacitive branch and at least one capacitive and resistive branch shunting the capacitive branch. A summing amplifier, having its input connected to a junction in the impedance network which is common to all of the branches, produces an output voltage which is proportional to the sum of the currents in all of the network branches. This output voltage represents a solution of the equation $$\frac{n}{l}\frac{\delta k}{k} = \dot{n} + \Sigma \dot{c}_i$$

The capacitive branch of the network is adapted to give the electrical analog of $\dot{n}$ and the capacitive and resistive branches are arranged to give the electrical analogs of $\dot{c}_i$.

By suitable means the voltage output of the summing amplifier which is representative of $n\delta k/k$ can be manipulated to give a signal proportional to $\delta k/k$ or some function thereof. This signal may be used to actuate a suitably calibrated meter or it may be used to actuate other apparatus controlling the reactor itself.

A detailed description of a particular embodiment of my invention is given in the following specification. In the specification reference is made to the accompanying drawing. In this drawing.

Figure 1:
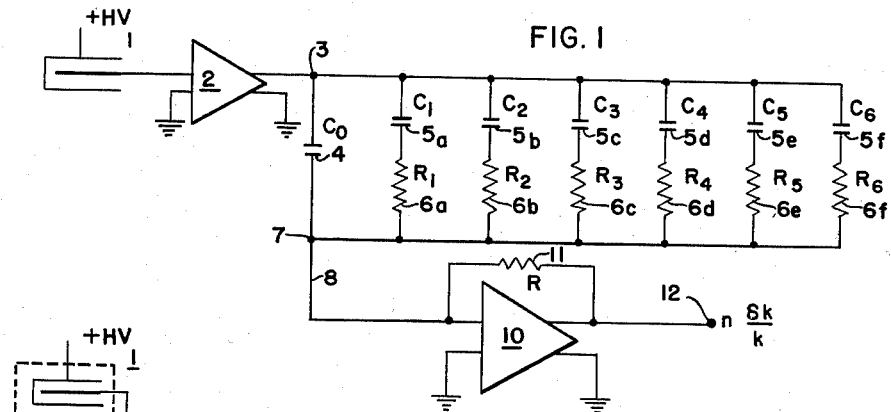
Fig. 1 is a schematic representation of reactivity computing apparatus.

Referring now to Fig. 1 there is indicated generally at 1 an ionization chamber which may be of any suitable type. Such chambers are standard apparatus for detecting neutrons in nuclear reactors. The ionization chamber is connected to a suitable amplifier 2. The output of this amplifier is connected to the input terminal 3 of an impedance network comprising a plurality of parallel branches the first of which is the capacitive branch $C_0$ at 4. The other branches are capacitive-resistive combinations, the capacitances, $C_1$, of the several branches being designated 5a–f, respectively, and the corresponding resistances, $R_1$, being designated 6a–f. In this particular embodiment the $C_1$ and $R_1$ of each branch are connected in series. The terminal 7 is common to all the branches and is connected through the conductor 8 to the input of a direct current, high-gain, summing amplifier 10 having a feedback resistance, R, indicated at 11. Amplifiers of a type suitable for this purpose are described in detail in Korn and Korn: "Electronic Analog Computers," published by McGraw-Hill Publishing Co. (1952). The output signal of the amplifier 10 appears at the terminal 12.

Utilizing the symbols defined above, the values of each of the components of the impedance network illustrated in Fig. 1 are selected according to the following criterion. $C_0 = l/R$ where $l$ is the prompt neutron lifetime and R is any convenient value of the summing amplifier feedback resistance 11 in consistent units. The values for the resistive-capacitive brances of the impedance network are chosen as follows: $C_1 = \beta_1/R\lambda_1$ where $\beta_1$ is the fraction of all fission neutrons which arise from delayed neutron emitters of type $i$; R is, again, the value of the feedback resistance 11 for the summing amplifier 10; and $\lambda_1$ is the reciprocal mean life of the precursors of delayed neutron emitters of type $i$. $R_1 = R/\beta_1$ where R and $\beta_1$ are as previously defined. The time constant for this capacitive-resistive combination is given by the product of the component values, i.e., $C_1 R_1 = 1/\lambda_1$. Examples of specific values of $\beta_1$ and $\lambda_1$, for particular fissionable materials are given at Table 1.2.10, p. 109 of The Reactor Handbook, vol. 1, published by Technical Information Service, U.S. Atomic Energy Commission (1955).

Now, with component values selected as directed and an input voltage proportional to the total neutron flux applied to the input terminal 3 of the impedance network the circuit responds as follows to provide an instantaneous solution of the kinetic equation $$\frac{\delta k}{k}\frac{n}{l} = \dot{n} + \sum_1^6 \dot{c}_i$$

where $\dot{c}_i$ equals $$-\lambda_i c_i + \beta_i \frac{n}{l}$$

and the coefficients and variables are as previously defined. In the impedance network the current through the branch, $C_0$, comprising capacitance 4 is the electric analog of the $\dot{n}$ term in the kinetic equation. The current in the $C_1 R_1$ branch comprising capacitance 5a and resistance 6a is the electric analog of the variable $c_1$. Similarly the currents through the remaining branches comprising the capacitances 5b–f, respectively, and resistances 6b–f, respectively, are the electrical analogs of the variables $\dot{c}_2$ through $\dot{c}_6$.

All of the currents in the several branches of the network flow through the junction 7 which is common to all of the branches and this junction is connected to the input of amplifier 10. The sum of the currents represented by the output of the amplifier 10 is a voltage which is proportional to $$\frac{\delta k}{k}\frac{n}{l}$$

It may be used directly as an input signal to indicating and control apparatus, or it may be further manipulated to obtain a voltage or current proportional to $\delta k/k$ which is the reactivity, as previously defined, of the reactor at any particular time.

Figure 2:
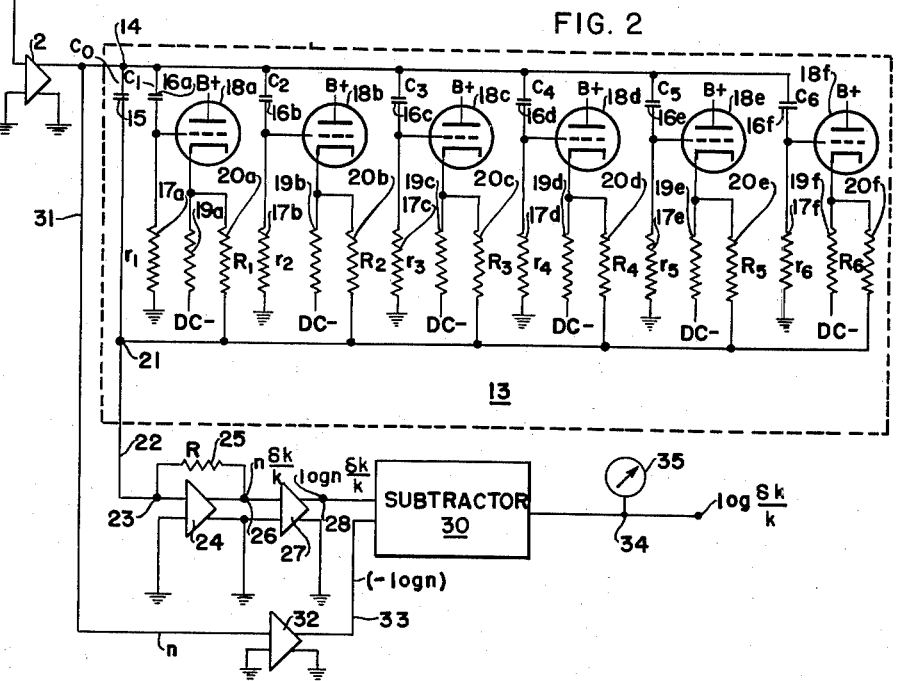
Fig. 2 is a schematic representation of a modification of the reactivity computing apparatus of Fig. 1.

In Fig. 2 I have illustrated one modification of the basic circuit shown in Fig. 1. In this embodiment the ionization chamber is again shown at 1 and an amplifier 2 is provided for raising the level of the signal from the chamber to a suitable magnitude. In Fig. 2 I have generally indicated at 13 a computing network the input terminal of which is indicated at 14. This embodiment includes the capacitive branch $C_0$ at 15 and six capacitive-resistive branches. Inasmuch as the capacitive-resistive branches are identical with the exception of variations among the values of their respective components, only the first branch will be described in detail.

Capacitance $C_1$ and resistance $r_1$ indicated at 16a and 17a, respectively, are connected in series from the input terminal to a suitable ground level potential. A triode vacuum tube 18a is arranged as a cathode follower. The input to the grid of the triode is the voltage developed across resistance 17a at the junction between the capacitance 16a and the resistance 17a. The vacuum tube is provided with a suitable cathode resistance 19a connected between the cathode and D.C.— taken from a suitable power supply. The load or summing resistance $R_1$ indicated at 20a is connected between the cathode of the triode and the output terminal 21, the latter terminal being common to all the branches of the network 13.

As will be understood by a skilled technician, the amplification factor $\mu$ of the cathode follower can be made to approach unity by the proper selection of the operating range of the triode. Therefore, the primary purpose of the triode is to isolate each branch of the circuit from every other branch, thereby minimizing interaction among them, without substantially affecting the desired function. As previously stated, the components of the other branches of the network comprising the capacitances 16b–f, resistances 17b–f, triodes 18b–f, and resistances 19 b–f and 20b–f are arranged identically with the corresponding components of the branch of the network described above in detail.

The terminal 21 of the network 13 is connected by lead 22 to the input terminal 23 of summing amplifier 24. As is the case with amplifier 10 of Fig. 1, this is also a direct current, high-gain summing amplifier having a feedback resistance R indicated at 25. The output terminal of the amplifier 24 is indicated at 26.

The values of the components in the several branches of the impedance network 13 of Fig. 2 are selected according to the following criteria. $C_0$ again equals $l/R$. The series combination of capacitances and resistances in each branch are selected so that $r_1 C_1 = 1/\lambda_1$. Here $C_1$ for any branch in any convenient fixed value and the values of $r_1$ for the corresponding branches are adjusted according to the expressions given above. The values of the summing resistances, $R_1$, are selected according to the relation $R_1 = R/\beta_1$ where R has any convenient value. As previously explained the values of $\beta_1$, $\lambda_1$, and $l$ are characteristic experimental values of the particular materials used in the reactor.

As in the case of Fig. 1, each of the branches of the network 13 contributes a current which is the electrical analog of a component of the kinetic equation describing the behavior of the reactor. The currents in the several branches are summed by the amplifier 24 and the output of this amplifier at the terminal 26 is the electrical analog of $n\delta k/k$.

I have shown symbolically the apparatus required to manipulate the amplifier voltage representative of $n\delta k/k$ is one way to provide a direct indication of the value $\delta k/k$. The analog voltage at the terminal 26 is utilized as the input to a logarithmic amplifier 27, the output of which, at the terminal 28, is proportional to log $n\delta k/k$. This voltage is used as one input to a subtracting device represented schematically at 30. Another input to the subtractor is the analog voltage of the quantity log $n$ where $n$ is proportional to the total neutron flux in the reactor. This second analog voltage is obtained as follows. A voltage proportional to $n$ is taken from the output of the amplifier 2 through the conductor 31 and is utilized as the input to a second logarithmic amplifier 32. The output of this second amplifier is connected to the subtractor 30 through the connection 33.

Any suitable type of subtracting apparatus may be used. For example, one common type comprises two triode vacuum tubes having a common cathode resistance. The two logarithmic input voltages are applied to the grids of the triodes, respectively. The polarity of the log $n$ voltage is, of course, reversed to represent $-\log n$. The voltage across the common cathode resistance will be proportional to the difference of the input voltages.

The arithmetic operation performed is illustrated by the general expression log $pq$—log $p$=log $q$, or, in this particular instance, log $n\delta k/k$—log $n$=log $\delta k/k$. Accordingly, the output voltages at the terminal 34 of the subtracting device 30 is the analog of log $\delta k/k$. A simple voltmeter 35 suitably calibrated and connected to the terminal 34 will then indicate directly the instantaneous value of $\delta k/k$ for any value of $n$, the total neutron flux represented by the voltage applied at the input terminal 14 of the impedance network. The voltage log $\delta k/k$ may also be used as the input voltage for other reactor instrumentation and apparatus where appropriate.

Figure 3:
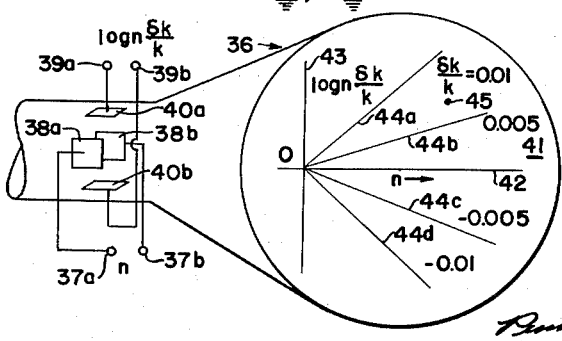
Fig. 3 is a representation of a cathode ray oscilloscope especially adapted for use with the reactivity computing apparatus of Fig. 2.

A second means for obtaining a direct visual indication of the value of $\delta k/k$ from the reactivity computing apparatus of Fig. 2 utilizes a cathode ray tube indicated at 36 in Fig. 3. Here the voltage analog of N at the output terminal of amplifier 2 in Fig. 2 is applied, properly phased, to the terminals 37a and 37b of the horizontal deflecting electrodes 38a and 38b, respectively, of the cathode ray tube. The voltage analog of log $n\delta k/k$ at the output terminal 28 of logarithmic amplifier 27 in Fig. 2 is applied, properly phased, to the terminals 39a and 39b of the vertical deflecting electrodes 40a and 40b, respectively. The fluorescent screen 41 of the cathode ray tube is especially calibrated so that the horizontal axis 42 represents values of neutron flux $n$ and the vertical axis 43 represents values of log $n\delta k/k$. Any desired number of lines radiating from the origin of the coordinate system and representative of constant values of $\delta k/k$, the reactivity, are also inscribed on the face of the cathode ray tube. For example, I have shown lines 44a—d which represent respectively constant values of $\delta k/k$ equal to 0.01, 0.005, —0.005, and —0.01. Now, it is evident that it is a simple matter to rapidly and accurately interpolate the value of $\delta k/k$ indicated by the spot produced by the electron beam falling on the face of the cathode ray tube. For example, the spot indicated at 45 would clearly have the value 0.007. Thus, by the means illustrated in Fig. 3, the operator of the reactor is immediately informed of the reactive condition of the reactor without further computation. Moreover, the delay between any change of the reactive condition of the reactor and its manifestation as a change of $\delta k/k$ on the face of the cathode ray tube is negligibly small for all practical purposes and is only dependent on the time constants of the several branches of the impedance network 13.

I have set forth the theoretical basis of my invention and have described a practical embodiment and modifications thereof. As is evident from the description, the invention provides a novel and useful apparatus for directly indicating, continuously and in real time, the reactivity of a nuclear reactor. It will be apparent to those skilled in the art that modifications of these particular embodiments may be made. Inasmuch as they are illustrated and described solely for purposes of illustrating the inventive concept, I do not propose to be limited by the details thereof. The scope of the invention is defined by the following claims.

I claim:

1. Reactivity computing apparatus for a nuclear reactor which apparatus comprises means responsive to neutrons for generating a source voltage proportional to the neutron flux in a selected portion of the reactive region of a nuclear reactor, an impedance network having an input terminal on which said source voltage is impressed and an output terminal, the impedance values of the elements of said network being selected such that the output signal of said network is the electrical analog of the product of the total number of neutrons in the reactor and the reactivity of the reactor, a summing amplifier having impressed on its input the output signal of said network, a first logarithmic amplifier having its input connected to the output of said summing amplifier and constructed and arranged to provide an output signal which is proportional to the logarithm of the output of the summing amplifier, a second logarithmic amplifier having its input connected to said source voltage and constructed and arranged to provide an output signal which is proportional to the logarithm of said source voltage, and means connected to the outputs of said first and second amplifiers for producing an output signal which is proportional to the difference of the output signals of said first and second amplifiers, and means for indicating the value of the output signal produced by said difference producing means.

2. Reactivity computing apparatus for a nuclear reactor which apparatus comprises means responsive to neutrons for generating a source voltage proportional to the neutron flux in a selected portion of the reactive region of a nuclear reactor, an impedance network having an input terminal and an output terminal and comprising a capacitive passive branch connected between said network input and output terminals and at least one active branch in shunt to said capacitive branch, each such active branch comprising a vacuum tube having at least a grid, a plate and a cathode and being arranged as a cathode follower, a capacitive-resistive input circuit connected in circuit between the network input terminal and the grid of said vacuum tube, and a resistive output circuit connected in circuit between the cathode of said vacuum tube and the network output terminal, the impedance value of said capacitive passive branch being selected such that the current therein due to said source voltage is the electrical analog of the prompt neutron life-time characteristic of a given reactor, the impedance values of said input circuit being selected such that the time constant thereof is proportional to the reciprocal mean life of precursors of delayed neutrons of a given kind in the given reactor and the impedance of the resistive output circuit is proportional to the fraction of all fission neutrons which arise from delayed neutron emitters of the previously given kind, a summing amplifier having its input connected to the network output terminal, a first amplifier having its input connected to the output of said summing amplifier and constructed and arranged to provide an output signal which is proportional to the logarithm of the output of the summing amplifier, a second amplifier having its input connected to said source voltage and constructed and arranged to provide an output signal which is proportional to the logarithm of said source voltage, and means connected to the outputs of said first and second amplifiers for producing an output signal which is proportional to the difference of the output signals of said first and second amplifiers, and means for indicating the value of the output signal produced by said difference means.

3. Reactivity computing apparatus for a nuclear reactor which apparatus comprises means responsive to neutrons for generating a source voltage proportional to the neutron flux in a selected portion of the reactive region of a nuclear reactor, an impedance network having an input terminal and an output terminal and comprising a capacitive passive branch connected between said network input and output terminals and at least one active branch in shunt to said capacitive branch, each such active branch comprising a vacuum tube having at least a grid, plate and a cathode and being arranged as a cathode follower, a capacitive-resistive input circuit connected in circuit between the network input terminal and the grid of said vacuum tube, and a resistive output circuit connected in circuit between the cathode of said vacuum tube and the network output terminal, the impedance value of said capacitive passive branch being selected such that the current therein due to said source voltage is the electrical analog of the prompt neutron lifetime characteristic of a given reactor, the impedance values of said input circuit being selected such that the time constant thereof is proportional to the reciprocal mean life of precursors of delayed neutrons of a given kind in the given reactor and the impedance of the resistive output circuit is proportional to the fraction of all fission neutrons which arise from delayed neutron emitters of the previously given kind, a summing amplifier having its input connected to the network output terminal, and means for indicating the magnitude of the output signal of said summing amplifier.

References Cited in the file of this patent

UNITED STATES PATENTS 2,244,369   Martin _____ June 3, 1941

OTHER REFERENCES

Transactions of the AIEE (Pagels), 1951, pages 1422–1426.
Electronics (Howard et al.), July 1953, pages 156 and 157.
Electronics (Binns), November 1953, pages 130–131.
Analog Methods in Computation and Simulation (Soroka) 1954, pages 82–86.

---

UNITED STATES PATENT OFFICE

CERTIFICATE OF CORRECTION

Patent No. 2,982,473                                                    May 2, 1961

Gerald Goertzel

It is hereby certified that error appears in the above numbered patent requiring correction and that the said Letters Patent should read as corrected below.

Column 3, line 31, for "brances" read -- branches --; line 53, for "$\overset{\circ}{c}_1$" read -- $\dot{c}_i$ --; same column 3, line 62, for "c₁" read -- $\dot{c}_1$ --; column 4, line 55, for "in" read -- is --; column 7, line 5, before "plate" insert -- a --.

Signed and sealed this 10th day of October 1961.

(SEAL)
Attest:

ERNEST W. SWIDER                                    DAVID L. LADD
Attesting Officer                                   Commissioner of Patents

USCOMM-DC

UNITED STATES PATENT OFFICE
CERTIFICATE OF CORRECTION

Patent No. 2,982,473            May 2, 1961

Gerald Goertzel

It is hereby certified that error appears in the above numbered patent requiring correction and that the said Letters Patent should read as corrected below.

Column 3, line 31, for "brances" read -- branches --; line 53, for "$\dot{c}_1$" read -- $\dot{c}_i$ --; same column 3, line 62, for "$c_1$" read -- $\dot{c}_1$ --; column 4, line 55, for "in" read -- is --; column 7, line 5, before "plate" insert -- a --.

Signed and sealed this 10th day of October 1961.

(SEAL)
Attest:

ERNEST W. SWIDER            DAVID L. LADD
Attesting Officer            Commissioner of Patents

USCOMM-DC